United States Patent
McKenna et al.

(10) Patent No.: US 6,885,864 B2
(45) Date of Patent: Apr. 26, 2005

(54) VIRTUAL PRIVATE NETWORK FOR CELLULAR COMMUNICATIONS

(75) Inventors: Daniel B. McKenna, Steamboat Springs, CO (US); Tommy Samuel Kemppainen, Toronto (CA)

(73) Assignee: Aircell, Inc., Louisville, CO (US)

( * ) Notice: Subject to any disclaimer, the term of this patent is extended or adjusted under 35 U.S.C. 154(b) by 232 days.

(21) Appl. No.: 09/961,647

(22) Filed: Sep. 24, 2001

(65) Prior Publication Data

US 2002/0013150 A1 Jan. 31, 2002

Related U.S. Application Data

(63) Continuation-in-part of application No. 08/960,183, filed on Oct. 29, 1997, now Pat. No. 6,108,539, which is a continuation-in-part of application No. 08/027,333, filed on Mar. 8, 1993, now Pat. No. 5,444,762, and a continuation-in-part of application No. 07/847,920, filed on Mar. 6, 1992, now Pat. No. 5,557,656.

(51) Int. Cl.[7] ................................................ H04Q 7/20
(52) U.S. Cl. ..................... 455/431; 455/427; 455/426.1; 455/554.1; 455/428
(58) Field of Search ................................ 455/431, 427, 455/11.1, 12.1, 426.1, 554.1, 456.1, 428

(56) References Cited

U.S. PATENT DOCUMENTS 5,805,683 A * 9/1998 Berberich, Jr. ......... 379/142.03
5,950,129 A * 9/1999 Schmid et al. ............... 455/431
6,067,442 A * 5/2000 Wiedeman et al. ......... 455/13.1
6,104,925 A * 8/2000 Grube et al. ................. 455/428
6,131,025 A * 10/2000 Riley et al. ............... 455/414.1
6,151,497 A * 11/2000 Yee et al. .................... 455/430
6,167,263 A * 12/2000 Campbell .................... 455/431
6,185,430 B1 * 2/2001 Yee et al. ..................... 455/519
6,243,580 B1 * 6/2001 Garner ......................... 455/428
6,269,243 B1 * 7/2001 Corbefin et al. ............. 455/431
6,535,743 B1 * 3/2003 Kennedy et al. .......... 455/456.1
6,539,237 B1 * 3/2003 Sayers et al. ................ 455/555

* cited by examiner

Primary Examiner—Sonny Trinh
Assistant Examiner—Huy Phan
(74) Attorney, Agent, or Firm—Patton & Boggs LLP (57) ABSTRACT

The virtual private network for cellular communications implements a secure local area voice and data network for use by members of an organization, such as a corporate customer. The virtual private network is implemented in the existing non-terrestrial cellular communications network in the form of software and routing tables that isolate the calls in the virtual private network from the existing cellular communications network infrastructure. This isolation can be effected, for example, by assigning fictitious station identifiers, such as telephone numbers, to the cellular subscriber stations served by the virtual private network. These fictitious numbers are identified by the gateway cellular switch that serves a customer's facility as subscribers served by the virtual private network.

21 Claims, 5 Drawing Sheets

VIRTUAL PRIVATE NETWORK FOR CELLULAR COMMUNICATIONS

CROSS-REFERENCE TO RELATED APPLICATIONS

This application is a continuation-in-part of U.S. patent application Ser. No. 08/960,183, filed Oct. 29, 1997 now U.S. Pat. No. 6,108,539 and titled "Non-Terrestrial Subscriber Station", which is a continuation-in-part of U.S. patent application Ser. No. 08/027,333, filed Mar. 8, 1993. U.S. patent application now Ser. No. 07/847,920 filed Mar. 6, 1992, now U.S. Pat. No. 5,444,762, titled "Method and Apparatus for Reducing Interference Among Cellular Telephone Signals" and U.S. Pat. No. 5,557,656, titled "Mobile Telephones".

FIELD OF THE INVENTION

This invention relates to cellular communications and, in particular, to a local area network that can only be accessed by identified members of an organization, which local area network is implemented in the existing cellular communications network.

PROBLEM

It is a problem in the field of cellular communications to provide a local area network and/or a private voice communication network for use by members of an organization, such as a corporate customer in a manner that prevents others from accessing the local area network and/or private voice communication network. The difficulty with providing secure communications in this environment is that the cellular subscriber stations are mobile and therefore must self-identify to receive the requested communication services. The self-identification of subscriber stations in the cellular environment is not foolproof, since unauthorized cellular subscriber stations can be programmed with MIN-ESN data that has been copied from authorized cellular subscriber stations. Thus, a private network implemented in this environment suffers from a lack of security since there are no guarantees that the cellular subscriber stations are authorized to receive the requested communication services.

SOLUTION

The above-described problems are solved and a technical advance achieved by the present virtual private network for cellular communications that implements a secure local area voice and data network for use by members of an organization, such as a corporate customer. The virtual private network is implemented in the existing cellular communications network in the form of software and routing tables that isolate the calls in the virtual private network from the existing cellular communications network infrastructure. This isolation can be effected, for example, by assigning fictitious station identifiers, such as telephone numbers, to the cellular subscriber stations served by the virtual private network. These fictitious numbers are identified by the gateway cellular switch that serves a customer's facility as subscribers served by the virtual private network. The dedicated links that interconnect the customer's facility with the gateway switch prevent others from breaching the security of the virtual private network by accessing the gateway switch through the Public Switched Telephone Network. In addition, the gateway switch manages the extension of the communication connection from the customer's facility to the visited cell site that serves the private virtual network cellular subscriber station. The gateway switch maintains data in the Home Location Register that identifies the present location of the private virtual network cellular subscriber station and ensures that the communication connection is extended exclusively to the private virtual network cellular subscriber station.

DETAILED DESCRIPTION OF THE DRAWINGS

Cellular mobile communications networks provide the service of connecting mobile telephone customers, each having a mobile cellular subscriber station, to both wireline-based customers who are served by the common carrier Public Switched Telephone Network as well as other mobile telephone customers. In such a system, all incoming and outgoing calls are routed through Mobile Telephone Switching Offices (MTSO), each of which is connected to a plurality of cell sites (base stations) which communicate with mobile cellular subscriber stations located in the area covered by the cell sites. The mobile cellular subscriber stations are served by the cell sites, each of which is located in one cell area of a larger service region. Each cell site in the service region is connected by a group of communication links to the Mobile Telephone Switching Office. Each cell site contains a group of radio transmitters and receivers with each transmitter-receiver pair being connected to one communication link. Each transmitter-receiver pair operates on a pair of radio frequencies: one frequency to transmit radio signals to the mobile cellular subscriber station and the other frequency to receive radio signals from the mobile cellular subscriber station. The first stage of a cellular communication connection is set up when a transmitter-receiver pair in a cell site, operating on a predetermined pair of radio frequencies, is turned on and a mobile cellular subscriber station, located in the cell site, is tuned to the same pair of radio frequencies. The second stage of the communication connection is between the communication link connected to this transmitter-receiver pair and the common carrier Public Switched Telephone Network. This second stage of the communication connection is set up in the Mobile Telephone Switching Office, which is connected to the common carrier Public Switched Telephone Network by incoming and outgoing trunks. The Mobile Telephone Switching Office contains a switching network to switch mobile customer voice and/or data signals from the communication link to an incoming or outgoing trunk. The communication connection is controlled by a Mobile Telephone Switching Office controller and a cell site controller at each cell site associated with the Mobile Telephone Switching Office. A plurality of data links connect the Mobile Telephone Switching Office controller and the associated cell site controllers.

The Mobile Telephone Switching Office controller operates under control of complex software and controls the switching network. The Mobile Telephone Switching Office controller also controls the actions of the associated cell site controllers by generating and interpreting the control messages that are exchanged with the associated cell site controllers over the data links. The cell site controllers at each cell site, in response to control messages from the Mobile Telephone Switching Office, control the transmitter-receiver pairs at the cell site. The control processes at each cell site also control the tuning of the mobile cellular subscriber stations to the selected radio frequencies. In the case of CDMA, the system also selects the PN code word to enhance isolation.

Each cell in the ground-based cellular mobile communications network comprises a predetermined volume of space radially arranged around the cell site transmitting antenna with the region of space roughly approximating a cylindrical volume having limited height. Since all of the mobile subscriber stations are installed in ground-based units (such as motor vehicles or handheld units) in traditional cellular mobile Communications systems, the antenna radiation pattern of the cell site is aligned to be proximate to the ground and the polarization of the signals produced by the cell site antenna is vertical in nature. In order to prevent the radio signals in one cell site from interfering with radio signals in an adjacent cell site, the transmitter frequencies for adjacent cell sites are selected to be different so that there is sufficient frequency separation between adjacent transmitter frequencies to avoid overlapping transmissions among adjacent cell sites.

In order to reuse the same frequencies, the cellular Communications industry has developed a small but finite number of transmitter frequencies and a cell site allocation pattern that ensures that two adjacent cell sites do not operate on the same frequency. When a ground-based mobile subscriber station initiates a call connection, control signals from the local cell site transmitter cause the frequency agile transponder in the ground-based mobile subscriber station to operate at the frequency of operation designated for that particular cell site. As the ground-based mobile subscriber station moves from one cell site to another, the call connection is handed off to the successive cell sites and the frequency agile transponder in the ground-based mobile subscriber station adjusts its frequency of operation to correspond to the frequency of operation of the transmitter located in the cell site in which the ground-based mobile subscriber station is presently operational.

There are numerous technologies that can be used to implement the cellular mobile Communications system and these include both digital and analog paradigms, with the digital apparatus representing the more recent of the two technologies. Furthermore, the frequency spectrum is allocated for different cellular communication systems, with the personal communication system (PCS) systems being located in the 1.9 GHz region of the spectrum while traditional cellular systems are located in the 800 MHZ region of the spectrum. The access methods used in cellular communication systems include Code Division Multiple Access (CDMA) that uses orthogonal codes to implement communication channels, Time Division Multiple Access (TDMA) which uses time division multiplexing of a frequency to implement communication channels and Frequency Division Multiple Access (FDMA) which uses separate frequencies to implement communication channels, as well as combinations of these technologies. These technologies are not limitations to the system which is described herein, since a novel system concept is disclosed, not a specific technologically limited implementation of an existing system concept.

A multi-dimensional cellular mobile communications network extends the usage of existing cellular mobile communications radio frequencies allocated for ground-based communications to non-terrestrial mobile cellular subscriber stations in a manner that avoids the possibility of signal interference between the ground-based and non-terrestrial mobile cellular subscriber stations operating in the same area. The multi-dimensional cellular mobile communications network adds an overlay of non-terrestrial cells of predetermined geometry and locus in space to the existing ground-based cellular mobile communications network. The polarization of the cellular radio signals produced by the non-terrestrial antenna elements is a polarization that is different than and preferably substantially orthogonal to the polarization of the cellular radio signals produced by the ground-based antennas, such as a horizontal polarization, to thereby minimize the possibility of interference with the nominally vertically polarized ground-based cellular radio signals. Furthermore, the control signals exchanged between the non-terrestrial mobile cellular subscriber stations and the non-terrestrial cell site controller are architected to avoid the possibility of interference with ground-based cell site transmitter-receiver pairs. In particular, the control channels used for the non-terrestrial mobile cellular subscriber stations are selected such that the control signals transmitted in these channels are unrecognizable to the ground-based mobile cellular subscriber stations and cell site transmitter-receiver pairs, so that even if broadcasts from a non-terrestrial mobile cellular subscriber station reach a ground-based mobile cellular subscriber station or cell site receiver, they cannot be interpreted and are rejected out of hand. In CDMA systems, this feature may also be implemented in the PN code space to provide signal isolation.

Multi-Dimensional Cellular Mobile Communications Network Architecture

Figure 1A:
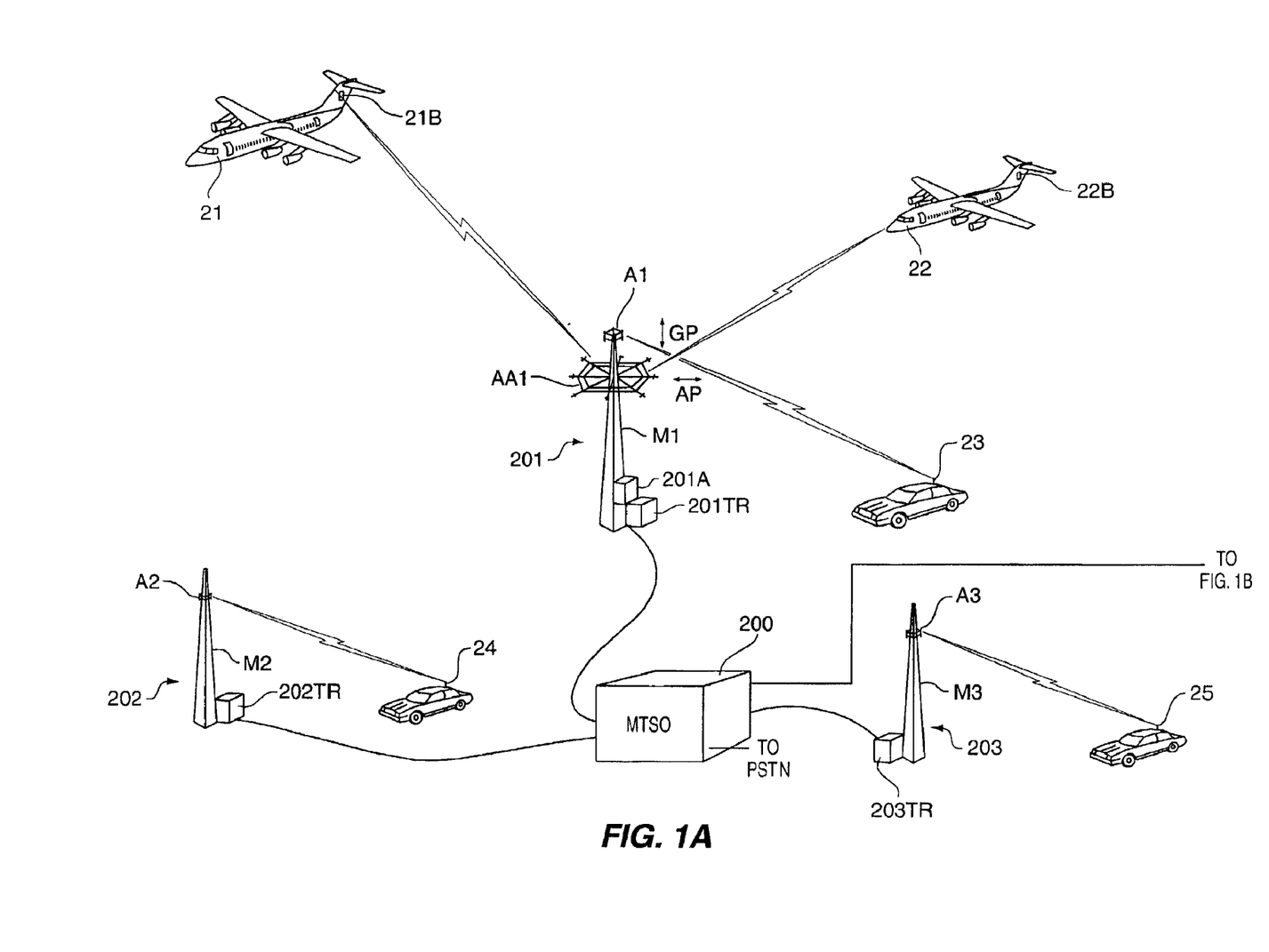
FIGS. 1A & 1B illustrate, in block diagram form, the overall architecture of the present virtual private network for cellular communications and a multi-dimensional cellular communication network in which it is implemented.

FIG. 1A illustrates, in block diagram form, the overall architecture of a multi-dimensional cellular mobile communications network. This diagram illustrates the basic concepts of the multi-dimensional cellular mobile communications network and, for the purpose of simplicity of illustration, does not comprise all of the elements found in a typical network. The fundamental elements disclosed in FIG. 1A provide a teaching of the interrelationship of the various elements which are used to implement a multi-dimensional cellular mobile communications network.

The terms "cell site" and "cell" are sometimes loosely used in the literature, and the term "cell site" generally denotes the locus at which the transmitter and receiver apparatus is located, while the term "cell" generally denotes the region of space which is served by a particular transmitter-receiver pair which is installed at a cell site. The particular technology used to implement the communications between mobile cellular subscriber stations and the transmitter-receiver pairs as well as the nature of the data transferred there between, be it voice, video, telemetry, computer data, and the like, are not limitations to the system which is described herein, since a novel system concept is disclosed, not a specific technologically limited implementation of an existing system concept. Therefore, the term "cellular" as it is used herein denotes a communication system which operates on the basis of dividing space into a plurality of volumetric sections or cells, and managing communications between mobile cellular subscriber stations located in the cells and the associated transmitter-receiver pairs located at the cell site for each of these cells. In addition, the term "communications cell" is used in the general sense and includes a traditional cell generated by a cell site as well as a sector of a cell, as well as a cell elevation sector, regardless of size and shape.

The cellular radio communications service provided in North America, for example, is designed primarily for motor vehicles and other ground-based mobile cellular subscriber stations. The system presently in use uses a plurality of radio frequency channels in the Ultra-High Frequency (UHF) band. A channel in this system comprises a pair of UHF frequencies in the designated band. One frequency in the channel is termed the "forward" carrier and is used for transmissions from the base station to the mobile cellular subscriber station, while the other frequency in the pair is termed the "reverse" carrier and is used for transmissions from the mobile cellular subscriber station to the base station. Present technologies in use include analog Frequency Modulation (FM) as the method for transmitting the signal with an 30 kHz frequency channel spacing. There is also digital transmission capability in some systems, wherein a plurality of signals is multiplexed on to the same carrier, with the 30 kHz spacing between adjacent bands (TDMA) or the code space is divided into multiple channels (CDMA).

In North America, the 800 MHZ analog spectrum is optimized as follows. A total of 832 such channels are available for cellular telephone use, and these channels are located between the frequencies of 824 MHZ to 849 MHZ, and 869 MHZ to 894 MHZ. The transmitter has 832 communication channels, 790 voice/data communication and 42 control channels. This set of channels is divided into two subsets, each consisting of 21 control channels and an associated 395 voice/data channels. A first set of channels is typically termed the "A" side of the band and the remaining set of channels is typically termed the "B" side of the band. The 416 radio channels in each set of channels are divided into 21 control channels and 395 voice/data communication channels. The 395 voice/data communication channels can be subdivided into a predetermined number of groups, with a typical selection being seven groups of approximately 56 channels in a seven cell channel reuse plan, termed a K=7 plan.

The basic ground-based cellular communications network of the prior art is incorporated into the non-terrestrial cellular communications network to enable the non-terrestrial mobile cellular subscriber stations to be integrated into the existing service structure. In particular, the Mobile Telephone Switching Office 200 serves to interconnect a plurality of ground-based cells 201, 202, 203 with the Public Switched Telephone Network (PSTN), as noted above. The ground-based cells 201, 202, 203 each include a transmitter-receiver pair 201TR, 202TR, 203TR and an antenna complex, which typically comprises a tower M1, M2, M3 to which is affixed one or more antenna elements A1, A2, A3, respectively.

Existing cellular mobile communications networks use both directional and non-directional antenna elements to implement the desired antenna characteristic pattern. Directional antenna, as the term is used herein, does not imply that a signal is transmitted or received from a particular direction, but that the antenna has a non-isotropic radiation pattern. A directional antenna, or a plurality of directional antenna elements, is preferably used on the ground-based cellular base station to increase signal separation. The antenna structure used in ground-based mobile cellular subscriber stations is such that signals emanating from the cell site transmitter antenna elements of antennas A1, A2, A3, propagate in a substantially radial direction from the antenna in all directions with the top of the antenna pattern being substantially coplanar with the Earth's surface and at a level that corresponds to the elevation of the transmitter antenna above the Earth's surface. The receiver antenna has characteristics that are analogous to that of the transmitter antenna. The polarization of these signals is vertical in nature, shown by arrow GP in FIG. 1A.

The multi-dimensional cellular mobile communications network adds to the existing mobile cellular communications network one or more non-terrestrial cells. A non-terrestrial cell is defined as an installation which is equipped with at least one non-terrestrial cell site transmitter-receiver pair, such as 201A and an associated antenna AA1 for receiving and transmitting cellular communications transmissions to and from non-terrestrial mobile cellular subscriber station, such as aircraft 21, 22, which are equipped with mobile cellular subscriber stations 21B, 22B. The non-terrestrial transmitter-receiver pair 201A is interconnected to the Public Switched Telephone Network PSTN via the Mobile Telephone Switching Office MTSO. The non-terrestrial cell site antenna AA1 has a radio signal radiation pattern which is directed above a horizontal plane encompassing the antenna. The majority of the radiated radio signal is directed at angles above the horizontal plane, which angles are typically in the range of 1.5° to 4° in magnitude, to avoid interference with ground-based mobile cellular telephone stations 23, 24, 25. The multi-path effect is also minimized since the energy level of the signals impinging on the reflective earth surface is reduced. In addition, the polarization of these radio signals is selected to be substantially orthogonal to the polarization of the radio signals emanating from the ground-based antennas, and is typically horizontally polarized, as shown by arrow AP in FIG. 1A. The non-terrestrial cell site transmitter-receiver pair 201A can be integrated with an existing ground-based cell site transmitter-receiver pair, in that there is some sharing of equipment which mounts the antenna elements on a common tower M1 and/or interconnects both cell site transmitter-receiver pairs to the Public Switched Telephone Network PSTN. In the embodiment of FIG. 1A, the non-terrestrial cell site antenna elements AA1 are mounted on the same tower M1 as the antenna elements A1 used to implement the ground-based cell site. The non-terrestrial cell site antenna elements AA1 are typically mounted below the existing antenna elements A1 used to implement (or reserved for) the ground-based cell site, which also reduces the ground footprint, thus reducing the Service Area Boundary as it exists for a ground-based mobile, meaning the airborne frequency can be re-used on the ground much sooner than otherwise possible.

Non-Terrestrial Mobile Cellular Subscriber Station

In the above description of the multidimensional cellular communication system, the non-terrestrial mobile cellular subscriber station is assumed for the purpose of the description to be resident in a small fixed wing aircraft. However, the nature of the mobile unit MU in which the mobile cellular subscriber station MS (FIG. 2) is installed is not limited to this application. In particular, the mobile unit MU can be a lighter than air craft, a helicopter, or a commercial multi-passenger fixed wing aircraft, or the like. The only limiting factor is that the mobile unit MU is operational in the non-terrestrial cells rather than the ground-based cells when a communication connection is established.

Figure 2:
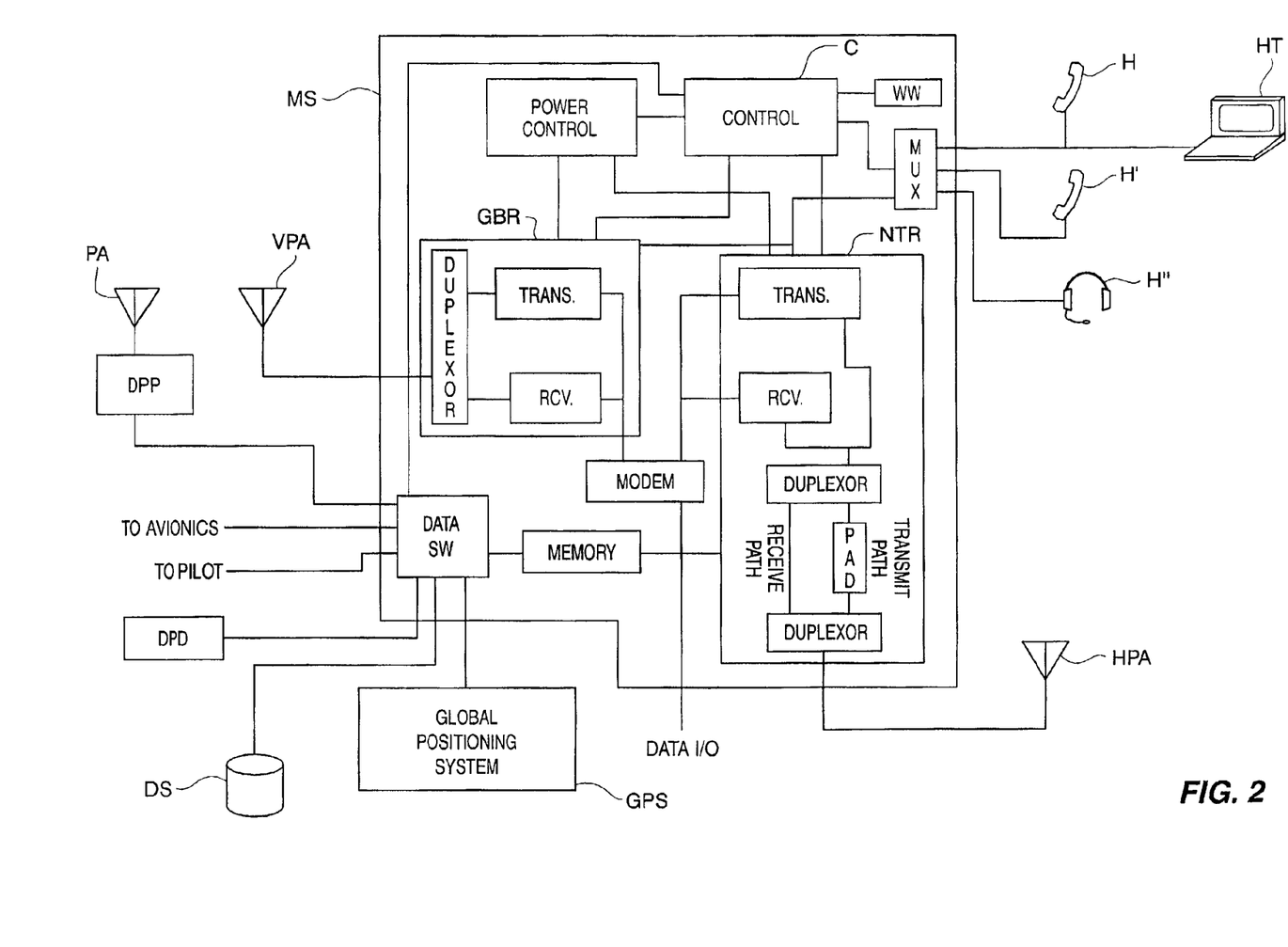
FIG. 2 illustrates the architecture of a typical non-terrestrial cellular subscriber station.

A specific exception to this general rule is that a "ground-based" cell in the non-terrestrial cellular communications network can be established at, for example, an airport location to serve the aircraft located on the ground prior to the aircraft taking off and entering the non-terrestrial cell extant in the region of space above the airport. This ground-based cell is part of the non-terrestrial cellular communications network and operates via the conventional ground-based cellular mobile communications technology, but can operate on a low power basis, since the transmit range can be limited to the bounds of the airport, thereby avoiding interference with the adjacent non-terrestrial and ground-based cells. The mobile unit MU can contain mobile unit location apparatus WW to identify whether the non-terrestrial mobile cellular subscriber station MS should be served by the non-terrestrial cell or the ground-based cell. The mobile unit location apparatus WW produces an indication of whether the mobile unit MU is aloft and the control circuit C automatically switches between the non-terrestrial cell and the ground-based cell located at the airport by activating the appropriate radio apparatus to initiate a communication connection. To achieve the automatic transition, the mobile unit MU can be equipped with both a non-terrestrial mobile cellular subscriber station radio apparatus NTR as well as a ground-based mobile cellular subscriber station radio apparatus GBR. The mobile unit MU can switch between the non-terrestrial and ground-based systems in response to the pilot's activation of the aircraft landing gear, or the "weight on wheels" condition when the aircraft touches down, as determined by the mobile unit location apparatus WW. The partitioned switch can signal the serving non-terrestrial cell site that a hard handoff is requested to the resident "ground-based" non-terrestrial cell, as is well known in the cellular communications technology. The existing call can then be transparently switched between the serving systems without interrupting the existing call.

There are a number of possible implementations of the above-noted ground-based cell. The ground-based cell can be a non-terrestrial cell having the characteristics of the above-noted non-terrestrial cells but sited at ground level to serve the aircraft while they are on the ground. The handoff between this ground-based non-terrestrial cell and the non-terrestrial cell that overlies this area is simply a handoff between two adjacent non-terrestrial cells. Alternatively, the ground-based cell can be a traditional ground-based cellular mobile communications cell and the handoff between this cell and the non-terrestrial cell that overlies this area is a handoff between two different networks, or two different partitions on the network. These differences are noted above and are not repeated here for the sake of brevity. In addition, the implementation of the non-terrestrial mobile cellular subscriber station MS can comprise separate ground-based mobile cellular subscriber station radio apparatus GBR and non-terrestrial mobile cellular subscriber station radio apparatus NTR, or this apparatus can be integrated into a single physical unit with software control of the transitions between the non-terrestrial and ground-based modes.

The non-terrestrial mobile cellular subscriber station MS located in the mobile unit MU is shown as including both non-terrestrial and ground-based communication apparatus. In implementation, this equipment can comprise a conventional stand-alone ground-based mobile cellular subscriber station which is connected to a separate non-terrestrial mobile cellular subscriber station, since the ground-based apparatus is optional, although the integrated unit is illustrated herein for the purpose of this description. The non-terrestrial mobile cellular subscriber station MS is typically equipped with a non-terrestrial mobile cellular subscriber station radio apparatus NTR and a ground-based mobile cellular subscriber station radio apparatus GBR, each of which includes the transmitter TRANS and receiver RCV circuits well known in cellular communications. The apparatus also includes a non-terrestrial antenna HPA (horizontally polarized) and a ground-based antenna VPA (vertically polarized), which are typically mounted on an exterior surface of the mobile unit MU. The antenna mounting can be directly fixed to the mobile unit MU or can be located in a separate unit which is mounted on the exterior surface of the mobile unit MU. In this latter case, the non-terrestrial antenna HPA can be mechanically steered so that the radiation pattern of the antenna elements can be aligned with the cell site transmitter and receiver antennas to thereby enhance the quality of the communication therebetween. Alternatively, the non-terrestrial antenna HPA can be electronically steered by adjusting the phase and/or magnitude of the signals applied to the antenna elements of an array as is well known in this technology. The power output of the non-terrestrial transmitter TRANS can also be regulated as a function of the distance from the cell site transmitter antenna to ensure a relatively constant signal level, using the Dynamic Power Control circuit presently available in many cellular radio systems.

Furthermore, the non-terrestrial mobile cellular subscriber station MS may be used to serve a single handset unit H or can be multiplexed through the multiplexer MUX to serve a plurality of handset (and/or headset) units H, H', H" as in a commercial airliner application. The handsets H, H', H" can be hard wired to the non-terrestrial mobile cellular subscriber station MS or can be wireless handset units H' of limited communication range which interconnect with the non-terrestrial mobile cellular subscriber station MS via radio frequency transmissions. In the multi-user application, the non-terrestrial mobile cellular subscriber station MS can comprise a "mini-cell" wherein the various handsets H, H', H" are managed by the non-terrestrial mobile cellular subscriber station MS in a manner analogous to that performed by the typical cell site/MTSO. Thus, the handset units H, H', H" can be of a different technology than the single handset applications, with the non-terrestrial mobile cellular subscriber station MS performing an integration function as well as the call multiplexing function. The handsets H, H', H" can be personal communication system (PCS) units, pagers, code division multiple access (CDMA) units, or any other wireless communication devices which are in use by individuals. The non-terrestrial mobile cellular subscriber station MS receives the signals generated by the various handset units H, H', H" and formats (if necessary) the data contained in these transmissions into the format used for the radio link transmissions to the cell site. The resultant signal is applied via the transmitter TRANS contained in the non-terrestrial mobile cellular subscriber station radio apparatus NTR to the antenna HPA mounted on the exterior of the mobile unit MU, which radiates the signals to the serving cell site.

The communications in the reverse direction are managed in a complementary manner as is well-known in the art. The handset units H, H', H" each have a unique identification which enables the underlying cellular communication network to communicate with the unit. The non-terrestrial mobile cellular subscriber station MS can therefore perform the handset registration function by polling the handset units H, H' extant in the space served by the non-terrestrial mobile cellular subscriber station MS to thereby identify these units. This unit identification data can then be transmitted to the cell site via the cellular radio control channels to enable the cellular network to ascertain the location of these particular units. Thus, when a ground-based subscriber (for example) initiates a call to one of these handset units H, H' the MTSO can scan the mobile subscriber records to locate the identified mobile cellular subscriber station. This data is then used by the cellular network to establish a communication link to the identified mobile cellular subscriber station MU. In this manner, what may traditionally be considered ground-based mobile cellular subscriber stations can function as non-terrestrial mobile cellular subscriber stations in the environment just described.

Data Features of the Non-Terrestrial Mobile Subscriber Station

The inherent differences between the mobile cellular subscriber station used by subscribers in ground-based and non-terrestrial systems provide opportunities for enhanced capabilities in the non-terrestrial mobile cellular subscriber station. In particular, the ground-based mobile unit is either a user carrying the mobile cellular subscriber station or an automobile in which the mobile cellular subscriber station is installed. In both instances, the need for additional services or features is limited. In contrast, the use of a non-terrestrial mobile cellular subscriber station MS is typically in an aircraft MU, which has an existing set of communications needs which can be served, either uniquely or redundantly, by the non-terrestrial mobile cellular subscriber station MS.

In particular, the communication needs associated with an aircraft include, but are not limited to, the classes of services noted herein:

Occupant data communications

Telemetry relay

Aircraft safety and maintenance

Pilot-Controller communications

Aircraft operations support

Each of these categories represents an opportunity to use the inherent communications capabilities of the non-terrestrial mobile cellular subscriber station MS in a transparent manner. The voice communications activity in a non-terrestrial mobile cellular subscriber station MS is typically only a minimal use of the communication capacity of this equipment. Therefore, as shown in FIG. 2, the non-terrestrial mobile cellular subscriber station MS can be interconnected with a plurality of existing apparatus in the aircraft or with newly installed equipment to provide these services.

The data communication capability of the non-terrestrial mobile cellular subscriber station MS can be enhanced by increasing the bandwidth of the communication connection that is established with the cell site. There are a number of ways to provide an increased bandwidth, including allocating multiple communication channels to the data communication function. Thus, a single call connection for data communication purposes comprises multiple physical communication channels managed in parallel to thereby multiply the data communication capacity associated with a single channel in the system. Alternatively, dedicated data communication channels can be allocated in the defined communication space, with the data communication channels occupying the bandwidth of multiple voice communication channels. In either case, the data communication capability of the non-terrestrial mobile cellular subscriber station MS can be adapted to suit the needs of the non-terrestrial vehicle and its operation.

Occupant Communications

A first example is the occupant data communications class of service wherein the aircraft occupants can interconnect a terminal device HT with the handset H to obtain additional communications capability. An example of this is the use of a personal computer, equipped with a modem, to the handset connection to thereby enable the user to transmit and receive data over the cellular voice communication connection, as is well known. The data can include facsimile transmissions, E-Mail, data files and the like. Additionally, the terminal device HT can include a video display and the data displayed thereon can be entertainment/informational programs that are retrieved from a program data storage system DS resident in the aircraft or uploaded from the cell site or a source connected to the non-terrestrial mobile cellular subscriber station MS via a cellular communication connection. Additionally, the non-terrestrial mobile cellular subscriber station MS can have a built-in modem MODEM for the provision of data communication functions to any user selected peripheral device (not shown) to extend the capabilities of this apparatus.

Telemetry Data Collection

As the aircraft flight path is traversed, the non-terrestrial mobile cellular subscriber station MS, or a second transceiver DPP (such as a spread spectrum transceiver) which is connected to the non-terrestrial mobile cellular subscriber station MS, can function to retrieve data from ground sites, such as telemetry system TEL, via the use of a polling capability. In particular, there are numerous remotely located ground-based telemetry stations TEL which function to collect data, such as oil/gas well output data, stream flow data, meteorological data, and the like. The collection of this data is expensive since there typically is no existing communication infrastructure that serves these sites. The second transceiver DPP connected to the non-terrestrial mobile cellular subscriber station MS can establish a communication connection to these ground-based telemetry stations TEL as the aircraft flies over these sites. Since the non-terrestrial mobile cellular subscriber station MS is aircraft based, a line of sight communication capability from the second transceiver DPP covers a significant amount of ground area. The telemetry communication can be effected by automatically, or on a periodic basis, broadcasting a poll query via polling antenna PA in a downward direction. The ground-based telemetry stations TEL that are within communication range of the second transceiver DPP can respond to the poll, in well known fashion, to upload telemetry data to the non-terrestrial mobile cellular subscriber station MS for storage in data storage memory MEMORY for later transmission to a data collection site or the data storage memory MEMORY can comprise a data storage medium, such as a magnetic tape, which is physically removed from the non-terrestrial mobile cellular subscriber station MS for delivery to a data collection center. Alternatively, the control channel (or voice multiplexed with data) of the non-terrestrial mobile cellular subscriber station MS can be used for data transmission during an existing voice communication call or the communication link can be automatically activated to originate a data transfer call when the non-terrestrial mobile cellular subscriber station MS is not in use.

The diagram of FIG. 2 illustrates a typical application of the telemetry data collection function. A radio gateway node RGN is sited to collect data from a plurality of remotely located telemetry systems TEL. Each telemetry system TEL can be considered to be a remote node of a data collection system. For example, the radio gateway node RGN can be a ground-based wireless communication system located at a site where it is connected to the Public Switched Telephone Network PTSN to thereby enable the radio gateway node RGN to establish data communication connections with remotely located data processing equipment. The radio gateway node RGN collects data from a plurality of remotely located nodes, each comprising a telemetry system TEL by means of the non-terrestrial mobile cellular subscriber station MS located in an aircraft that is engaged in an overflight of the region served by the radio gateway node RGN. The data collection function is initiated by the cooperative interaction between the radio gateway node RGN and the non-terrestrial mobile cellular subscriber station MS to create a communication connection therebetween to initiate a data collection operation. The radio gateway node RGN transmits a poll to the non-terrestrial mobile cellular subscriber station MS, which relays the received poll to the telemetry system TEL as noted above. The telemetry system TEL responds to this received poll by formatting the data stored in its memory pursuant to the appropriate protocol and transmitting this data to the non-terrestrial mobile cellular subscriber station MS. The non-terrestrial mobile cellular subscriber station MS simply relays the received data to the radio gateway node RGN, where it is stored in the data collection node contained therein for later processing and/or transmission to the data processing center. The polls transmitted by the radio gateway node RGN can be specifically addressed, as is well known, to a selected telemetry station TEL, so that the received response can be simply recorded and associated with the site at which the addressed telemetry station TEL is located.

Thus, the non-terrestrial mobile cellular subscriber station MS can function as an ultra-low earth orbit repeater station for the ground-based telemetry stations TEL. Where the aircraft is equipped with a Global Positioning System (GPS), this apparatus can be used to precisely locate aircraft, and direction of travel, so that the polling of the ground-based telemetry stations can be selective, since the non-terrestrial mobile cellular subscriber station can identify which ground-based telemetry stations are now in polling range of the aircraft.

Aircraft Safety and Maintenance

The non-terrestrial mobile cellular subscriber station MS can also be connected to the avionics equipment resident in the aircraft to collect data relevant to the operation of the aircraft. The data can be collected and stored in the data storage memory MEMORY for later output to an aircraft monitoring system on the ground, or the data can be transmitted to an aircraft monitoring system on the ground during an existing voice communication call, or the communication link can be automatically activated to originate a data transfer call when the non-terrestrial mobile cellular subscriber station MS is not in use. The control circuit C in the non-terrestrial mobile cellular subscriber station MS can, in well-known fashion, scan the data output terminals of the various elements of the avionics to retrieve the desired data. This enables the non-terrestrial mobile cellular subscriber station MS to function as a real-time aircraft safety and maintenance system.

As part of the communication function, the non-terrestrial mobile cellular subscriber station MS can function to receive weather maps from air weather services. The weather maps can be generated at a ground station and transmitted to the aircraft in a compact data representation, with the particular content of the weather map being a function of the data needs of the pilot. The non-terrestrial mobile cellular subscriber station MS can therefore provide frequent updates to the weather maps using the data communication capabilities noted above and can enable the pilot to revise the flight plan and receive revised weather maps commensurate with the revised flight plan.

Pilot-Controller Communications

The aircraft has an existing set of communications equipment for pilot to air traffic controller communications. The non-terrestrial mobile cellular subscriber station MS can function as a redundant communication facility to supplement these existing facilities. Alternatively, the non-terrestrial mobile cellular subscriber station MS can exclusively perform this function. Furthermore, the non-terrestrial mobile cellular subscriber station MS can add GPS aircraft position data to the information communicated to the air traffic control systems for accurate aircraft position updates.

Aircraft Operations Support

As also shown in FIG. 2, the non-terrestrial mobile cellular subscriber station MS can be equipped with both data processing DPD and data storage memory DS elements to thereby enable the non-terrestrial mobile cellular subscriber station MS to perform additional support functions. In particular, the data related to the flight schedule of the aircraft can be stored in the data storage memory DS and transmitted to and received from ground-based systems via the cellular communication connections established by the non-terrestrial mobile cellular subscriber station MS. The types of data can include: passenger manifest, gate departure assignments for connecting flights at the destination airport, and the like.

Virtual Private Network Architecture

In the environment described above, it is a problem to provide a local area network and/or a private voice communication network for use by members of an organization, such as a corporate customer, in a manner that prevents others from accessing the local area network and/or private voice communication network. The difficulty with providing secure communications in this environment is that the cellular subscriber stations are mobile and therefore must self-identify to receive the requested communication services. The self-identification of subscriber stations in the cellular environment is not foolproof, since unauthorized cellular subscriber stations can be programmed with MIN-ESN data that has been copied from authorized cellular subscriber stations. Thus, a private network that is implemented in this environment suffers from a lack of security since there are no guarantees that the cellular subscriber stations are authorized to receive the requested communication services.

Figure 1B:
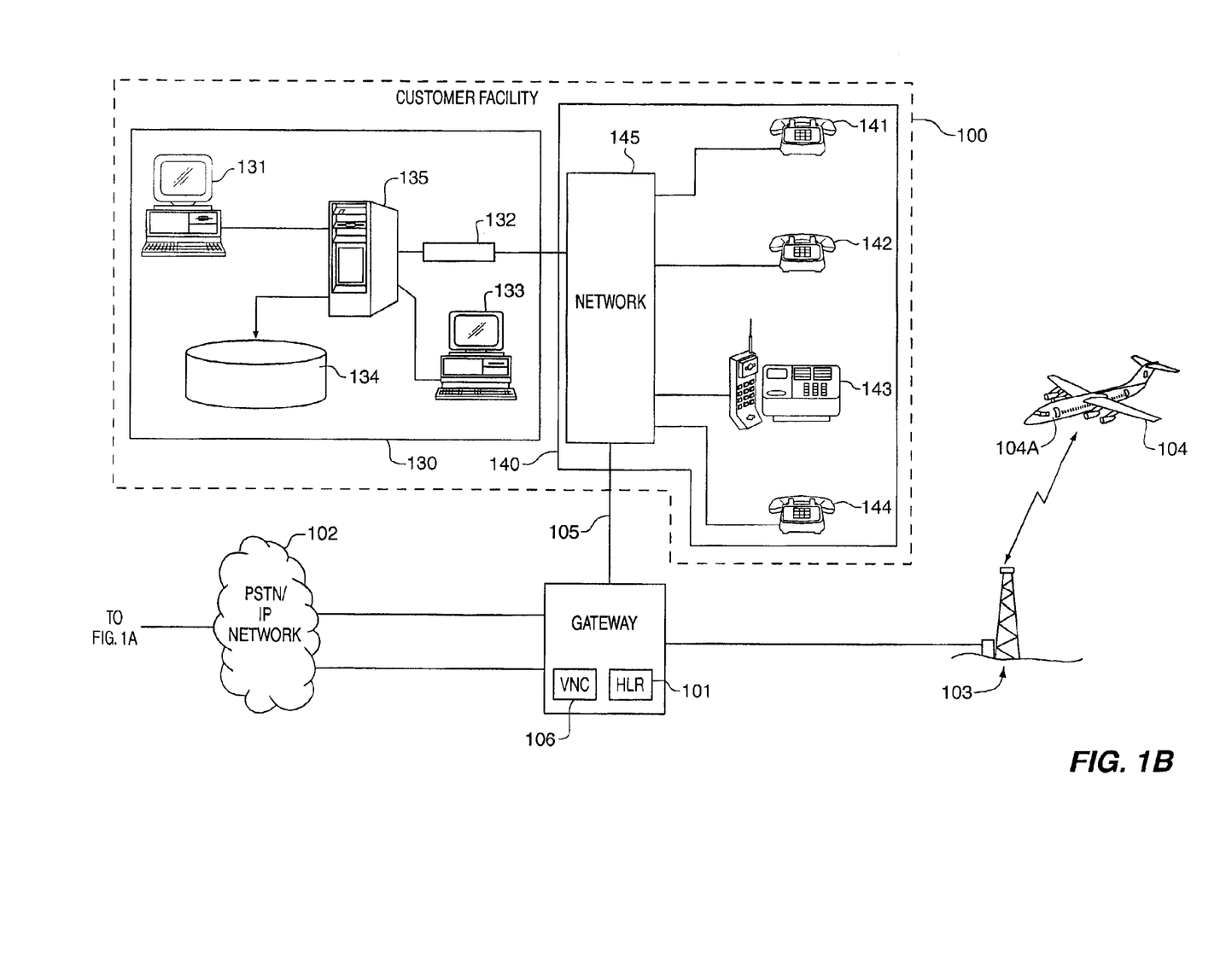

An example of the virtual private network for cellular communications is illustrated herein that provides a secure communications environment for use by members of an organization, such as a corporate customer, whether the members are connected to a customer's facility by wireline-based communication facilities or cellular communication facilities. The virtual private network for cellular communications disclosed herein includes a secure non-terrestrial communications component 105,106 as well as the local area network 130 and/or a private voice communication network 140 of a customer facility 100. The local area network 130 typically consists of a server 135 that serves a plurality of computer terminal devices 131, 133, memory 134 as well as a gateway 132 to a communication facility. The private voice communication network 140 typically includes a switching network 145 that serves a plurality of communication terminals 141–144 as well as the local area network 130. The virtual private network capability can be used with aircraft in a non-terrestrial cellular communications environment to provide secure communications between the aircraft and the operations center for the aircraft operator. For example, the virtual private network can transmit both voice and data between the customer facility 100 and the aircraft 104 via the private virtual network non-terrestrial cellular subscriber station 104A. This communication connection can be used to transfer aircraft data and to validate the transmission of data via other communication channels.

The virtual private network is a network that is logically separated from the underlying cellular non-terrestrial communication network while using the same communications infrastructure. The separation is achieved at the software and switch table levels while minimizing the hardware or leased facility requirements. This is accomplished by using fictitious telephone numbers that are not part of the communications network numbering plan. The Numbering Plan Area or area code portion of the dialed number in accessing the virtual private network does not conform to the Numbering Plan Area assignment rules and presently take the form of NXX, where N is any number between 2 and 9, while X is any number between 0 and 9. If the virtual private network selects a Numbering Plan Area that does not conform to these rules, such as 199, then the communications network equipment can identify this dialed number as a request to access the virtual private network. By using the fictitious Numbering Plan Area numbers, a high degree of separation is immediately achieved. In one example, these dialed numbers would be rejected by existing wireline-based communication networks as well as terrestrial cellular communication networks. The non-terrestrial cellular communication network can be equipped to recognize these fictitious Numbering Plan Area codes as entries in a Roamer Validation Table. Thus, a Home Location Register HLR is required to maintain a database of these fictitious numbers along with the associated Electronic Serial Numbers (ESN), the features assigned to these numbers as well as location data. Any Home Location Register can be used for this defined purpose. The private virtual network non-terrestrial cellular subscriber stations 21B, 22B, 104A are programmed with fictitious Mobile Identification Numbers (MIN). Roamer registration is implemented in the same manner as for valid MINs, since there are no restrictions on the types of MINs that may be passed aver the signaling protocols used in the cellular industry.

FIG. 1B illustrates the inter-dependence of the private virtual network non-terrestrial cellular subscriber stations 21B, 22B, 104A, the Mobile Telephone Switching Offices 101, 200, and the Home Location Register HLR. In order to facilitate inbound calls, wireline-based or terrestrial cellular to non-terrestrial cellular, it is necessary to use dedicated trunks 105 between the customer's facility 100 and a gateway Mobile Telephone Switching Office 101. The subscribers served by the telephone station sets 141–144 of the customer's facility 100 can then dial the numbers of the private virtual network non-terrestrial cellular subscriber stations 21B, 22B, 104A served by the virtual private network since they already have a secure connection to the virtual private network by their connection to the customer's facility 100, either a direct wireline based connection or a remote access connection through the Public Switched Telephone Network 102 via appropriate authentication processes extant on the customer's facility 100. This ensures that call originations from both venues are securely processed and maintained within the virtual private network that overlies the existing non-terrestrial cellular network.

Incoming Call to the Virtual Private Network Non-Terrestrial Subscriber Station

Figure 3:
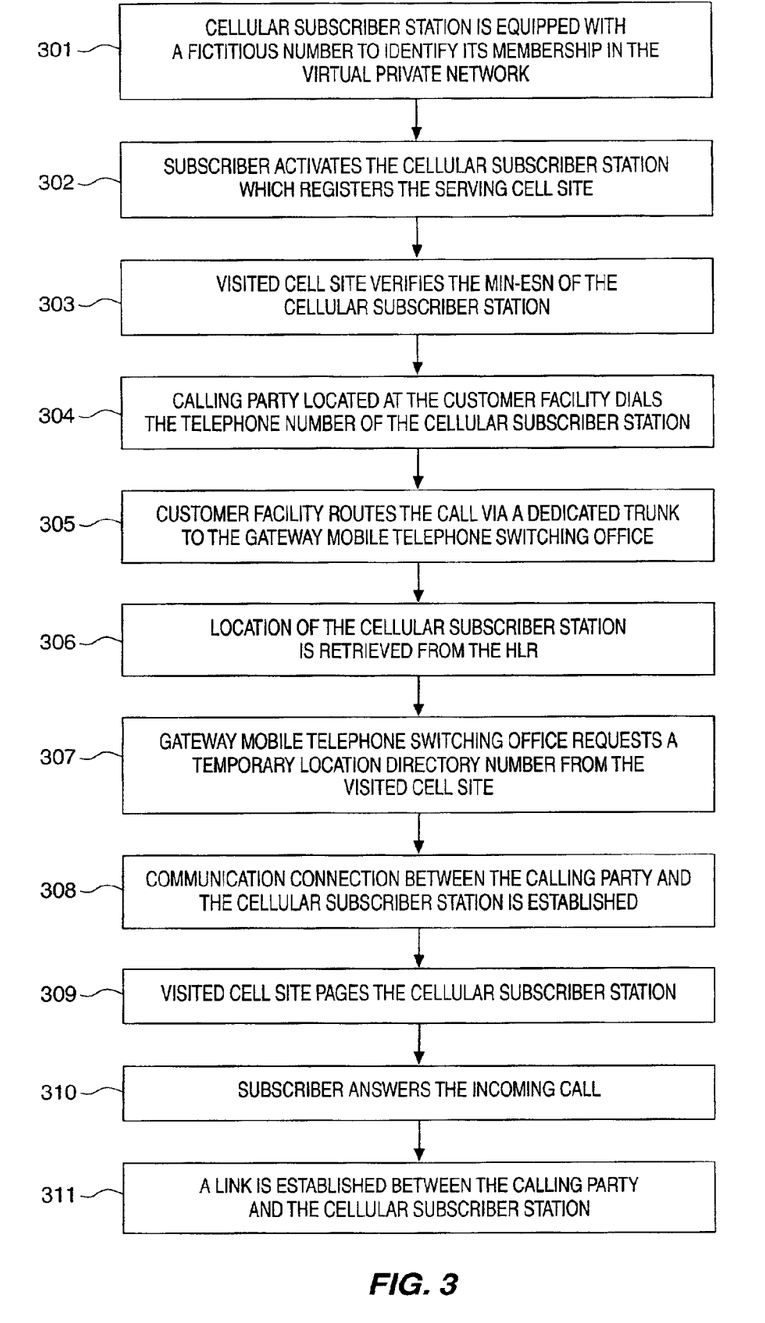
FIG. 3 illustrates in flow diagram form the operation of the present virtual private network for cellular communications to process incoming calls to the private virtual network cellular subscriber station.

FIG. 3 illustrates the processing of an incoming call from a wireline based subscriber 141 located at the customer's facility 100 to a private virtual network non-terrestrial cellular subscriber station 21B served by the non-terrestrial cellular communication system. At step 301, the private virtual network non-terrestrial cellular subscriber station 21B is equipped with a fictitious number to identify its membership in the virtual private network. As noted above, the fictitious numbers can be selected from those numbers that lie outside of the authorized set of subscriber numbers used in the existing communications network. At step 302, the subscriber activates the private virtual network non-terrestrial cellular subscriber station 21B, which registers with the serving cell site (visited cell site) 201A of the non-terrestrial cellular communication network, and the visited cell site 201A at step 303 verifies the MIN-ESN combination transmitted by the private virtual network non-terrestrial cellular subscriber station 21B with the corresponding MIN-ESN stored in the Home Location Register HLR, which can be located in the Mobile Telephone Switching Office (gateway cellular switch) 101 that hosts the private virtual network non-terrestrial cellular subscriber station 21B or any other location within the cellular network. Typically, for a selected customer, many if not all of the private virtual network non-terrestrial cellular subscriber stations are registered at a centrally located Mobile Telephone Switching Office 101 so all of the MIN-ESNs assigned to the virtual private network reside on a single Home Location Register HLR. Therefore, the visited cell site 201A communicates with the Home Location Register HLR of the gateway Mobile Telephone Switching Office 101 to ensure service authorization and to provide subscriber location data to the Home Location Register HLR.

An incoming call to this private virtual network non-terrestrial cellular subscriber station 21B is initiated at step 304 when a calling party 141, located at or served by the customer facility 100 directly dials the telephone number of the private virtual network non-terrestrial cellular subscriber station 21B. The customer facility 100 at step 305 recognizes the Numbering Plan Area portion of the dialed number as identifying a fictitious number that is part of the subscriber base of the customer facility 100 and routes the call via a dedicated trunk 105 to the gateway Mobile Telephone Switching Office 101. The gateway Mobile Telephone Switching Office 101 receives data indicative of the number dialed by the calling party and extends the call to the identified private virtual network non-terrestrial cellular subscriber station 21B. The location of the private virtual network non-terrestrial cellular subscriber station 21B is retrieved from the Home Location Register HLR at step 306. The location of the private virtual network non-terrestrial cellular subscriber station 21B is used to enable the gateway Mobile Telephone Switching Office 101 to request a Temporary Location Directory Number (TLDN) for the roaming private virtual network non-terrestrial cellular subscriber station 21B at step 307. The Temporary Location Directory Number is a real telephone number that is used to establish a communication connection between the gateway Mobile Telephone Switching Office 101 and the visited cell site 201A. The Temporary Location Directory Number is used until the communication connection between the calling party 141 and the private virtual network non-terrestrial cellular subscriber station 21B is established at step 308, and then it is released for subsequent calls. This link between the gateway Mobile Telephone Switching Office 101 and the visited cell site 201A can be via dedicated lines or public switched facilities 102. The visited cell site associates the Temporary Location Directory Number with the private virtual network non-terrestrial cellular subscriber station 21B, then pages the private virtual network non-terrestrial cellular subscriber station 21B at step 309, which causes the private virtual network non-terrestrial cellular subscriber station 21B to ring. Once the subscriber answers the incoming call at step 310, the link is established between the calling party 141 and the private virtual network non-terrestrial cellular subscriber station 21B via the virtual private network implemented via the use of the fictitious number at step 311. The subscriber can be assured that the calling party is a member of the virtual private network due to the inability of others to effect the call connection.

Outgoing Call from Wireless Non-Terrestrial Subscriber Station

Figure 4:
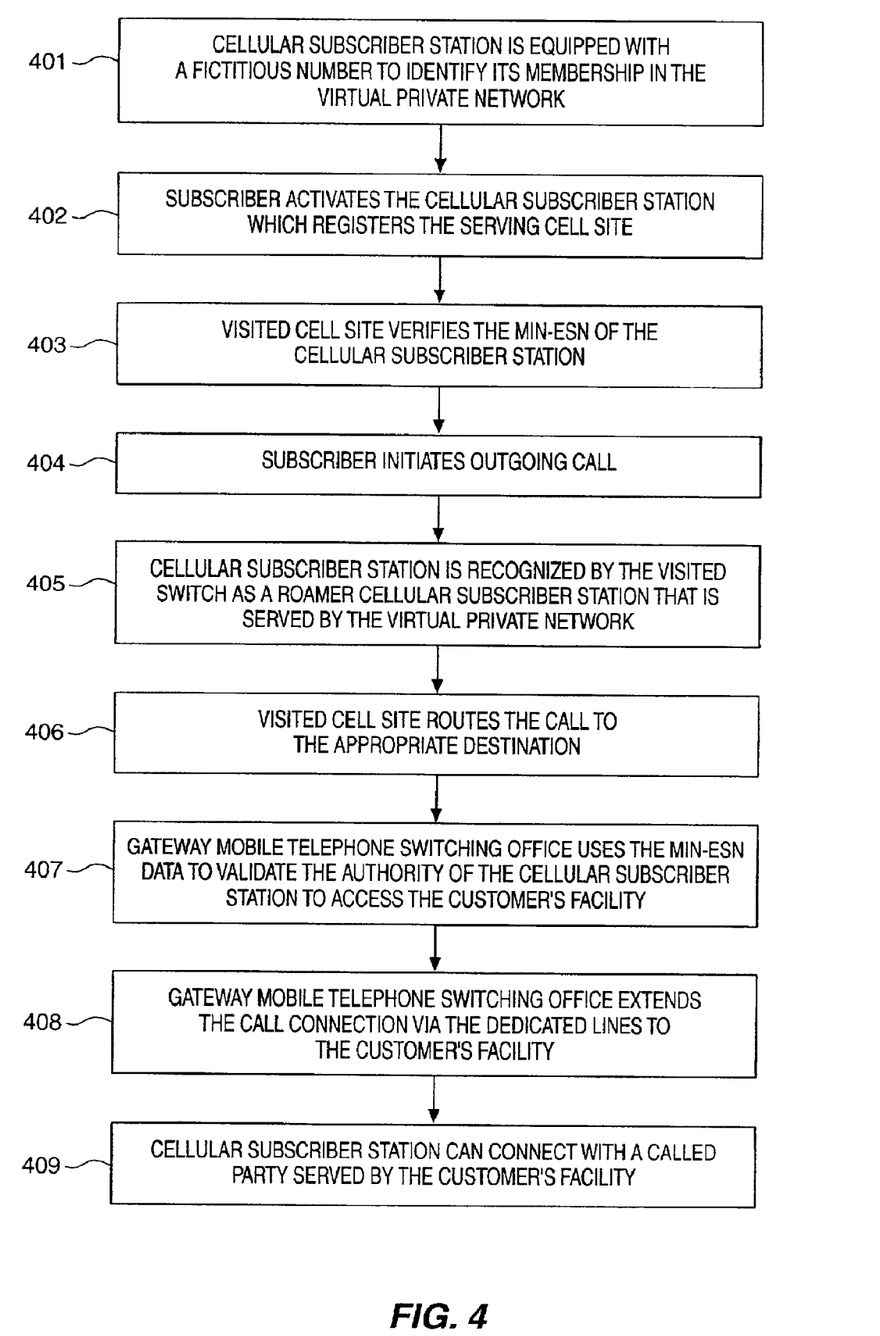
FIG. 4 illustrates in flow diagram form the operation of the present virtual private network for cellular communications to process outgoing calls from the private virtual network cellular subscriber station.

An outgoing call from the private virtual network non-terrestrial cellular subscriber station 21B to the customer's facility 100 operates in the reverse direction in a manner that is analogous to the incoming call described above. At step 401, the private virtual network non-terrestrial cellular subscriber station 21B is equipped with a fictitious number to identify its membership in the virtual private network. As noted above, the fictitious numbers can be selected from those numbers that lie outside of the authorized set of subscriber numbers used in the existing communications network. At step 402, the subscriber activates the private virtual network non-terrestrial cellular subscriber station 21B, which registers with the serving cell site (visited cell site) 201A of the non-terrestrial cellular communication network, and the visited cell site 201A at step 403 verifies the MIN-ESN combination transmitted by the private virtual network non-terrestrial cellular subscriber station 21B with the corresponding MIN-ESN stored in the Home Location Register HLR of the Mobile Telephone Switching Office (gateway cellular switch) 101 that hosts the private virtual network non-terrestrial cellular subscriber station 21B. Typically, for a selected customer, many if not all of the private virtual network non-terrestrial cellular subscriber stations are registered at a centrally located Mobile Telephone Switching Office 101 so all of the MIN-ESNs assigned to the virtual private network reside on a single Home Location Register HLR. Therefore, the visited cell site 201A communicates with the Home Location Register HLR of the gateway Mobile Telephone Switching Office 101 to ensure service authorization and to provide subscriber location data to the Home Location Register HLR. At step 404, the subscriber initiates an outgoing call and the private virtual network non-terrestrial cellular subscriber station 21B is recognized by the visited switch 201A as a roamer private virtual network non-terrestrial cellular subscriber station 21B that is served by the virtual private network at step 405. The visited cell site 201A checks the MIN-ESN of the private virtual network non-terrestrial cellular subscriber station 21 B to ensure authorization of this private virtual network non-terrestrial cellular subscriber station 21B to access the virtual private network. The number dialed by the subscriber is received by the visited cell site 201A and used to route the call to the appropriate destination at step 406. For example, the subscriber may wish to access the customer's facility 100 and can do so by dialing an access number that identifies this customer's facility 100. The visited cell site 201A extends the call connection over either dedicated lines or switched public facilities 102 to the gateway Mobile Telephone Switching Office 101 where the MIN-ESN data that identifies the private virtual network non-terrestrial cellular subscriber station 21B is used to validate the authority of the private virtual network non-terrestrial cellular subscriber station 21B to access the customer's facility 100 at step 407. The gateway Mobile Telephone Switching Office 101 then extends the call connection via the dedicated lines 105 to the customers facility 100 at step 408. Once connected to the customer's facility 100, the private virtual network non-terrestrial cellular subscriber station 21B can connect with an outside line, if permitted, or have the call extended to a person 142 served by the customer's facility 100 at step 409.

Incoming Call from Other than the Customer's Facility

In the case of incoming calls received at the gateway Mobile Telephone Switching Office 101 from other than the customer's facility 100, the gateway Mobile Telephone Switching Office 101 receives ANI data indicative of the calling party's identity. This caller identification information can be used to block incoming calls from unauthorized parties, or preferably, all calls from the public network 102. Thus, absent arrival of an incoming call from the customer's facility 100 via the dedicated links 105, the gateway Mobile Telephone Switching Office 101 rejects a call destined for a private virtual network non-terrestrial cellular subscriber station 21B.

Summary

The virtual private network for non-terrestrial digital cellular communications implements a secure local area voice and data network for use by members of an organization, such as a corporate customer. The virtual private network is implemented in the existing non-terrestrial cellular communications network in the form of software and routing tables that isolate the calls in the virtual private network from the existing non-terrestrial cellular communications network infrastructure. This isolation can be effected, for example, by assigning fictitious station identifiers, such as telephone numbers, to the non-terrestrial cellular subscriber stations served by the virtual private network. These fictitious numbers are identified by the gateway cellular switch that serves a customer's facility as subscribers served by the virtual private network.

What is claimed:

1. A virtual private network for providing cellular radio communication with mobile subscriber stations located in aircraft in flight, where said mobile subscriber stations engage in calls via said virtual private network, comprising:

customer facility means for providing private telecommunication services to a plurality of subscriber stations connected to said customer facility means;

a plurality of private virtual network cellular subscriber stations for enabling a subscriber who is equipped with a one of said private virtual network cellular subscriber stations to access said private telecommunications services provided by said customer facility means;

gateway cellular switch means for communicating with said private virtual network cellular subscriber stations;

dedicated link means for interconnecting said customer facility means and said gateway cellular switch means to enable communications there between; and virtual network control means for establishing secure communication connections between said private virtual network cellular subscriber stations and said customer facility means.

2. The virtual private network of claim 1 wherein said customer facilty means comprises:

local communication network means for establishing communication connections between selected ones of said plurality of subscriber stations and said dedicated link means.

3. The virtual private network of claim 1 wherein said gateway cellular switch means comprises:

location register means for maintaining location data relating to at least one of said plurality of private virtual network cellular subscriber stations.

4. The virtual private network of claim 3 wherein said gateway cellular switch means further comprises:

means, responsive to an incoming call connection received from said customer facility means via said dedicated link means and identifying a selected one of said private virtual network cellular subscriber stations, for retrieving location data relating to said selected private virtual network cellular subscriber station from said location register means; and means for extending said incoming call connection to a visited cell site serving said selected private virtual network cellular subscriber stations.

5. The virtual private network of claim 1 wherein said virtual network control means comprises:

subscriber station identification means for maintaining a plurality of data, each representative of a unique identification of a corresponding one of said plurality of private virtual network cellular subscriber stations.

6. The virtual private network of claim 1 wherein said virtual network control means comprises:

fictitious number means for maintaining a plurality of data, each representative of a unique identification of a corresponding one of said plurality of private virtual network cellular subscriber stations, said data including an invalid numbering plan area and a unique station identification number.

7. The virtual private network of claim 6 wherein said virtual network control means further comprises:

virtual private network membership means for maintaining data that indicates a correspondence between said plurality of data, each representative of a unique identification of a corresponding one of said plurality of private virtual network cellular subscriber stations, and a corresponding customer facility means with which said private virtual network cellular subscriber station is authorized to communicate.

8. A method of operating a virtual private network for providing cellular radio communication with a plurality of private virtual network cellular subscriber stations located in aircraft in flight, where said private virtual network cellular subscriber stations engage in calls via said virtual private network, comprising:

providing private telecommunication services to a plurality of subscriber stations connected to a customer facility;

operating a gateway cellular switch for communicating with said private virtual network cellular subscriber stations;

interconnecting said customer facility and said gateway cellular switch via dedicated links to enable communications there between; and establishing secure communication connections between said private virtual network cellular subscriber stations and said customer facility.

9. The method of operating a virtual private network of claim 8 wherein said step of providing telecommunication services comprises:

establishing communication connections between selected ones of said plurality of subscriber stations and said dedicated links.

10. The method of operating a virtual private network of claim 8 wherein said step of operating a gateway cellular switch comprises:

maintaining location data relating to at least one of said plurality of private virtual network cellular subscriber stations.

11. The method of operating a virtual private network of claim 10 wherein said step of operating a gateway cellular switch further comprises:

retrieving, in response to an incoming call connection received from said customer facility via said dedicated links and identifying a selected one of said private virtual network cellular subscriber stations, location data relating to said selected private virtual network cellular subscriber station from said location register; and extending said incoming call connection to a visited cell site serving said selected private virtual network cellular subscriber stations.

12. The method of operating a virtual private network of claim 8 wherein said step of establishing secure communication connections comprises:

maintaining a plurality of data, each representative of a unique identification of a corresponding one of said plurality of private virtual network cellular subscriber stations.

13. The method of operating a virtual private network of claim 8 wherein said step of establishing secure communication connections comprises:

maintaining a plurality of fictitious number data, each representative of a unique identification of a corresponding one of said plurality of private virtual network cellular subscriber stations, said data including an invalid numbering plan area and a unique station identification number.

14. The method of operating a virtual private network of claim 13 wherein said step of establishing secure communication connections further comprises:

maintaining data that indicates a correspondence between said plurality of data, each representative of a unique identification of a corresponding one of said plurality of private virtual network cellular subscriber stations, and a corresponding customer facility with which said private virtual network cellular subscriber station is authorized to communicate.

15. A virtual private network for providing cellular radio communication with mobile subscriber stations located in aircraft in flight, where said mobile subscriber stations engage in calls via said virtual private network, comprising:

means for providing private telecommunication services to a plurality of subscriber stations connected to said customer facility means;

a plurality of private virtual network cellular subscriber stations for enabling a subscriber who is equipped with a one of said private virtual network cellular subscriber stations to access said private telecommunications services provided by said customer facility means;

means for communicating with said private virtual network cellular subscriber stations;

dedicated link means for interconnecting said customer facility means and said gateway cellular switch means to enable communications there between; and means for establishing secure communication connections between said private virtual network cellular subscriber stations and said customer facility means.

16. The virtual private network of claim 15 wherein said means for providing telecommunication services comprises:

means for establishing communication connections between selected ones of said plurality of subscriber stations and said dedicated link means.

17. The virtual private network of claim 15 wherein said means for communicating comprises:

means for maintaining location data relating to at least one of said plurality of private virtual network cellular subscriber stations.

18. The virtual private network of claim 17 wherein said means for communicating further comprises:

means, responsive to an incoming call connection received from said customer facility means via said dedicated link means and identifying a selected one of said private virtual network cellular subscriber stations, for retrieving location data relating to said selected private virtual network cellular subscriber station from said location register means; and means for extending said incoming call connection to a visited cell site serving said selected private virtual network cellular subscriber stations.

19. The virtual private network of claim 15 wherein said means for establishing secure communication connections comprises:

means for maintaining a plurality of data, each representative of a unique identification of a corresponding one of said plurality of private virtual network cellular subscriber stations.

20. The virtual private network of claim 15 wherein said means for establishing secure communication connections comprises:

means for maintaining a plurality of data, each representative of a unique identification of a corresponding one of said plurality of private virtual network cellular subscriber stations, said data including an invalid numbering plan area and a unique station identification number.

21. The virtual private network of claim 20 wherein said means for establishing secure communication connections further comprises:

means for maintaining data that indicates a correspondence between said plurality of data, each representative of a unique identification of a corresponding one of said plurality of private virtual network cellular subscriber stations, and a corresponding customer facility means with which said private virtual network cellular subscriber station is authorized to communicate.

* * * * *